(12) United States Patent
Bejerano et al.

(10) Patent No.: US 8,634,289 B2
(45) Date of Patent: Jan. 21, 2014

(54) EFFICIENT PROTECTION SCHEME FOR MPLS MULTICAST

(75) Inventors: Yigal Bejerano, Springfield, NJ (US); Pramod Koppol, Manalapan, NJ (US)

(73) Assignee: Alcatel Lucent, Paris (FR)

( * ) Notice: Subject to any disclaimer, the term of this patent is extended or adjusted under 35 U.S.C. 154(b) by 742 days.

(21) Appl. No.: 12/650,752

(22) Filed: Dec. 31, 2009

(65) Prior Publication Data

US 2011/0158128 A1 Jun. 30, 2011

(51) Int. Cl.
*H04J 3/14* (2006.01)

(52) U.S. Cl.
USPC .............................. 370/217; 370/256; 370/408

(58) Field of Classification Search
None
See application file for complete search history.

(56) References Cited

U.S. PATENT DOCUMENTS

| 7,619,987 B2 * | 11/2009 | Mitsumori .................... 370/254 |
| 2005/0210133 A1 * | 9/2005 | Florissi et al. ................ 709/224 |
| 2012/0201122 A1 * | 8/2012 | Mohan .......................... 370/217 |

OTHER PUBLICATIONS

Redundant Trees for Preplanned Recovery in Arbitrary Vertex-Redundant or Edge-Redundant Graphs, IEEE Transactions on Networking, vol. 7, No. 5, Oct. 1999.*
Redundant Trees for Preplanned Recovery in Arbitrary Vertex-Redundant or Edge-Redundant Graphs, Muriel Medard et al., IEEE Transactions on Networking, vol. 7, No. 5, pp. 641-652, Oct. 1999.*
Yigal Bejerano, Italo Busi, Laurent Ciavaglia, Enrique Hernandez-Valencia, Promod Koppol, Vincenzo Sestito, Martin Vigoureux, Resilient Multipoint Networks Based on Rudundant Trees, Aug. 2009, http://onlinelibrary.wiley.com/doi/10.1002/bltj.20376/pdf.
Huang Weili, Guo Hongyan, A Fault-tolerant Strategy for Multicasting in MPLS Networks. Computer Engineering and Technology, Jan. 22, 2009 International Conference on Computer Engineering and Technology, pp. 432-435.
Yigal Bejerano, Pramod V. Koppol, Optimal Construction of Redundant Multicast Trees in Directed Graphs, The 28th Conference on Computer Communications, Apr. 19, 2009. pp. 2696-2700.
Muriel Medard, Steven G. Finn, Richard A. Barry, Robert G. Gallagher. Redundant Trees for Preplanned Recovery in Arbitrary Vertex-Redundant or Edge-Redundant Graphs, IEEE/ACM Transactions on Networking, vol. 7, No. 5, Oct. 1999.

* cited by examiner

*Primary Examiner* — Andrew Lai
*Assistant Examiner* — Leon Andrews
(74) *Attorney, Agent, or Firm* — Kramer & Amado, P.C.

(57) ABSTRACT

A pair of Redundant Multicast Trees for each multicast connection connects the source of a multicast LSP to all its destinations in such a way that, in the event of a single link or node failure in the network, every destination node is still connected to the root node in at least one of the two trees. Furthermore, a method ensures that existing Redundant Multicast Trees can adapt to changes in the set of destination nodes and/or network topology changes without significant modifications.

20 Claims, 12 Drawing Sheets

EFFICIENT PROTECTION SCHEME FOR MPLS MULTICAST

FIELD OF THE INVENTION

The invention relates to Multi-Protocol Label Switching Multicast and is particularly concerned with efficient protection schemes for multicast networks.

BACKGROUND OF THE INVENTION

Fault resilience for MPLS multicast is becoming increasingly important as revenue generating multicast based business services such as IPTV and virtual private LAN services (VPLS) are being offered over the emerging MPLS based network infrastructure. Fault resilience has traditionally been achieved through protection and recovery mechanisms for link and/or node failures in a network. Such mechanisms in SONET/SDH networks have gained a reputation to be the best in the industry. Realizing a comparable reputation for fault resilience in the emerging MPLS based network infrastructure continues to be an area of active interest.

A connection in an MPLS network corresponds to a label switched path (LSP) and the goal of protection is to ensure that each LSP being protected (referred to as a primary LSP) continues to offer uninterrupted service in the event of any link or node failures. Such uninterrupted service is typically achieved through provisioning of one or more alternate LSPs such that, for each failure of the primary LSP, one of these alternate LSPs remains unaffected and can be activated if not already active.

MPLS fast reroute (FRR) has evolved as the de facto standard protection mechanism for LSPs with a single source and single destination (also known as Point-to-Point or P2P). In FRR, an alternate LSP, referred to as a detour, is established for each LSP segment that needs protection. The node at the beginning of this segment is referred to as the point of local repair (PLR) and the node at the end of this segment is referred to as the merge point (MP). A detour is typically routed along the shortest path (link/node disjoint from the path along the primary LSP) from the PLR to the MP. When a PLR detects a failure, it switches the traffic onto the detour protecting the failed segment and the MP simply merges the traffic from the segment and the detour. The recovery time, which is the time between the occurrence of a failure to the point when the associated detour is activated depends largely on the time it takes the PLR to detect a failure. If the segments to be protected are selected in such a way that the PLR for each segment can detect failures as fast as possible, then FRR can offer recovery times comparable to that in SONET/SDH networks. For example, if every link is protected, then link failure detection is entirely local to the PLR.

The management and signaling of detours for all the LSPs in a network, especially in the event of topological changes can become very complex and computationally burdensome on the network nodes. To alleviate such complexity, a variant known as facility protection is used where segments to be protected are defined along the network topology as opposed to each individual primary LSP and facility detours are created for such segments. Then, any primary LSP traversing a segment with a facility detour has its detour tunneled through the facility detour. Facility detours can be setup to protect links and/or network nodes.

To accommodate the increasing use of MPLS multicast, FRR is now being extended to support multicast LSPs with a single source and multiple destinations (also known as Point-to-Multi-Point or P2MP). FRR for P2MP LSPs, however, can be quite inefficient in terms of the bandwidth it consumes in the network and can involve even more signaling and management complexity due to the increased number of detours especially with dynamic changes in the set of destination nodes or in the event of topology changes. In FRR for P2P, at any given point in time, only one of the primary LSP or its detours can be active on a link.

In FRR for P2MP, however, given that there may be more than one destination node, a detour and the primary LSP may be simultaneously active on a given link. This can cause two copies of the same packet to be sent over such a link. The term packet duplication describes a situation where two or more copies of the same packet need to be sent on a link. Use of P2MP detours can cap the maximum number of copies sent on a link to two, but this comes at a cost of substantially increased signaling complexity or at a cost of wasteful bandwidth consumption, depending on how it is implemented.

These problems of FRR can get significantly magnified for high bandwidth multicast LSPs such as those used to carry IPTV content.

Therefore, it would be desirable to have a method of providing MPLS link and node protection which would not incur the expense and complications of protection as available in the prior art.

SUMMARY OF THE INVENTION

It is an object of the invention to provide a method for more efficient protection of MPLS Multicast networks.

According to an aspect of the invention there is provided a method for providing protection for a MPLS multicast connection request for a root node and a set of destination nodes in a packet switched network having network nodes and communication links connecting the network nodes, the method having the steps of constructing a pair of Redundant Multicast Trees; wherein the first Redundant Multicast Tree of the pair of Redundant Multicast Trees is rooted at the root node and connects to all destination nodes in the set of destination nodes; and wherein the second Redundant Multicast Tree of the pair of Redundant Multicast Trees is rooted at the root node and connects to all destination nodes in the set of destination nodes. Further, broadcasting multicast traffic from the root node to the set of destination nodes over the first Redundant Multicast Tree during normal operation; and broadcasting multicast traffic from the root node to the set of destination nodes over the first and second Redundant Multicast Tree during fault operation.

In some embodiments of the invention, the method includes broadcasting multicast traffic from the root node to the set of destination nodes over the second Redundant Multicast Tree during normal operation.

According to some embodiments, the fault operation includes a failure of a communication link of the communication links, and according to other embodiments the fault operation includes a failure of a network node of the network nodes.

According to another aspect of the invention there is provided a method for constructing a pair of Redundant Multicast Trees for a MPLS multicast connection request for a root node and a set of destination nodes in a packet switched network having network nodes and communication links connecting the network nodes, wherein the packet switched network can be represented by a graph as constructed from the root node, the graph having vertices comprising the network nodes, and the graph having directed edges comprising the communication links, the method including the steps of partitioning the packet switched network into a first partition and a second partition, wherein each partition consists of all of the network nodes of the packet switched network, each partition contains a subset of the communication links so as to form an acyclic graph of the packet switched network, and the first partition and the second partition have only links in common of the graph of the packet switched network from the group of links consisting of cut links and links to cut nodes. Then constructing a first spanning tree connecting the root node and the set of destination nodes in the first partition; constructing a second spanning tree connecting the root node and the set of destination nodes in the second partition; and provisioning the set of destination nodes with the first spanning tree and the second spanning tree as the pair of Redundant Multicast Trees.

In some embodiments the method also includes updating the first and second partitions in the event of a change to the topology of the packet switched network. The change to the topology of the packet switched network could include the deletion of a network node, or alternatively the addition of a network node or alternatively, the failure of a communication link of the packet switched network which results in a network node lacking an incoming link in one of the first and second partitions.

Advantageously, in some embodiments the method further includes as part of the partitioning step creating an ordered list of network nodes such that every non-root node has at least one preceding incoming neighbour node and at least one succeeding incoming neighbour node in the ordered list. Under some embodiments the partitioning step could further include formulating a pair of first and second subgraphs, wherein each of the subgraphs contains all network nodes, and wherein the first subgraph comprises a first set of communication links and the second subgraph comprises a second set of communication links; and wherein the first set of communication links is disjoint to the second set of communication links; the first subgraph corresponding to the first partition; and the second subgraph corresponding to the second partition.

In some embodiments the formulating step further includes providing a subset of communication links common to the first and second set of communication links wherein the subset of common links consists of cut links and links to cut nodes of the graph.

Advantageously, in some embodiments, the method includes updating the first and second partitions in the event of a change to the topology of the packet switched network.

Also advantageously, in some embodiments, the first spanning tree consists of a shortest path tree, while in other embodiments the first spanning tree consists of a Steiner tree.

According to yet another aspect of the invention, there is provided an article of manufacture including a processor-readable medium having processor-executable code encoded therein, which when executed by one or more processors, enables actions for constructing a pair of Redundant Multicast Trees for a MPLS multicast connection request for a root node and a set of destination nodes in a packet switched network having network nodes and communication links connecting the network nodes, wherein the packet switched network can be represented by a graph as constructed from the root node, the graph having vertices comprising the network nodes, and the graph having directed edges comprising the communication links, the method including the steps of partitioning the packet switched network into a first partition and a second partition, wherein each partition consists of all of the network nodes of the packet switched network, each partition contains a subset of the communication links so as to form an acyclic graph of the packet switched network, and the first partition and the second partition have only links in common of the graph of the packet switched network from the group of links consisting of cut links and links to cut nodes. Further constructing a first spanning tree connecting the root node and the set of destination nodes in the first partition; constructing a second spanning tree connecting the root node and the set of destination nodes in the second partition; and provisioning the set of destination nodes with the first spanning tree and the second spanning tree as the pair of Redundant Multicast Trees.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which.

DETAILED DESCRIPTION

Figure 1:
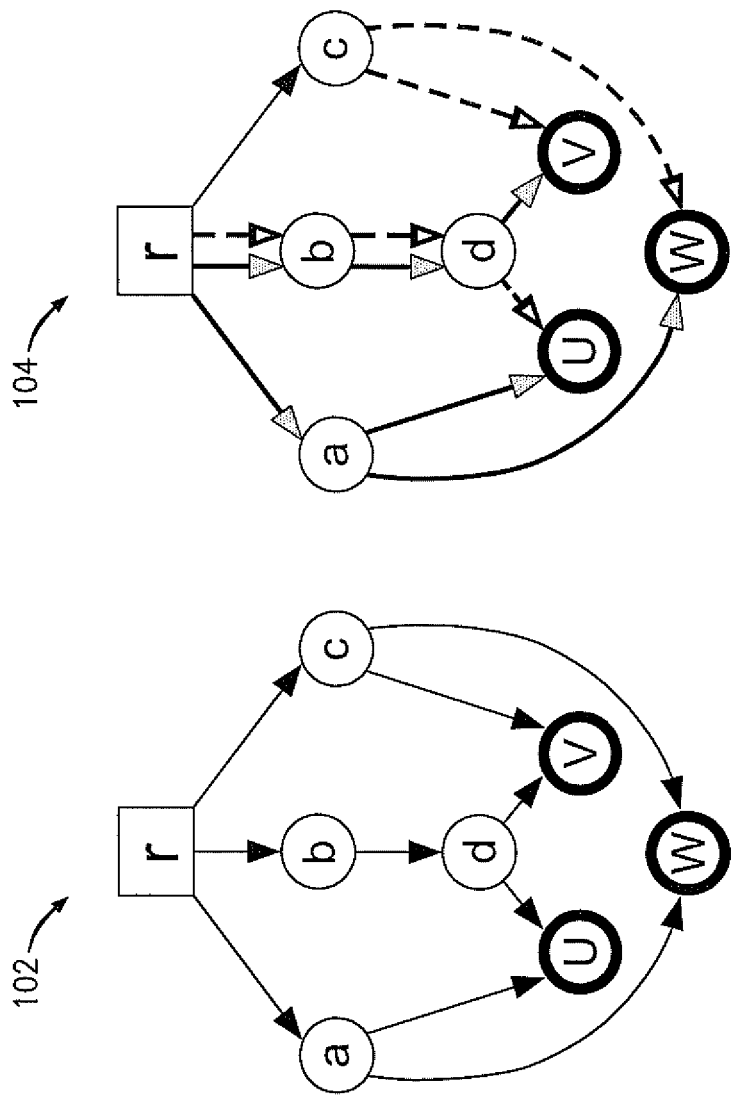
FIG. 1 illustrates an example of a set of network nodes having communication links, a root node, and a plurality of destination nodes; and a version of the same network with Redundant Multicast Trees in accordance with an embodiment of the invention.

Following is presented a novel and efficient protection mechanism for MPLS multicast that addresses the aforementioned bandwidth and complexity concerns of prior art protection schemes. The proposed mechanism is based on the concept of redundant multicast trees (RMTs). RMT based protection involves construction of two trees rooted at a multicast source such that the source node remains connected to all the multicast destination nodes in the event of the failure of a single link or a node. One of the trees of the RMT serves as the primary and the other serves as the standby for protection purposes. Protection may be achieved in one of two modes: hot standby or cold standby mode.

A hot standby mode where traffic is fed on both trees simultaneously by the source and the destination nodes pick one of the two feeds. A suitable mechanism for deciding on which feed to listen on can either be based on low level information exchange such as BFD or some equivalent mechanism between the root and the destination nodes. In the event of a failure of a single link or node, at least one of the two feeds is guaranteed to be active.

A cold standby mode where the source feeds traffic onto one of the two trees during normal operation, but feeds both the trees in the event of a failure.

In the hot standby mode, embodiments of the invention offers similar or even better recovery time compared to MPLS Fast Re-Route (FRR). The recovery time for the cold standby mode would depend on the mechanism used to communicate between the root and the destination nodes.

Given a multicast LSP connection request M for a root node r and a set of destination nodes D, the overall goal of the protection mechanism is as follows:

a) facilitate the construction of two P2MP LSPs each rooted at r which together constitute redundant multicast trees, and b) once such RMTs are constructed, provide the necessary mechanisms to ensure that the two P2MP LSPs continue to be RMTs in the presence of any changes due to the addition of new destination nodes, deletion of existing destination nodes, and/or changes in the underlying network topology caused by failures or more current information on available resources on the links.

In general, the solution to RMT construction and modification of such RMT to accommodate changes to the set of destination nodes and/or underlying network topology is based on partitioning of the network topology into two logical partitions through coloring of the network links. Construction of initial RMTs is realized by creating P2MP trees for a multicast connection request within each of these partitions.

Accommodation of changes needed by the RMTs thus constructed is realized by updating the logical partitioning in such a way that the number of links that need to change partitions that they belong to is minimized.

Network Model and Definitions

Consider an MPLS-based network that is modeled as a directed graph G(V,E), where each node $v \in V$ is a router/switch and the set of edges E are the directed communication links between them. A link from node u to node v is denoted by a directed edge $(u,v) \in E$, where nodes u and v are termed the edge tail and head, respectively. Moreover, node u is termed an incoming neighbor of node v, while node v is called an outgoing neighbor of node u. Every directed edge $e=(u,v) \in E$ is associated with a positive cost denoted by $c_e$ and the cost of (u,v) may be different from that of (v,u).

The mechanisms presented in the following description largely consider the network as seen from a given node $r \in V$ that serves as the root of a P2MP LSP. The following definitions are therefore implicitly from the point of view of r. A nonsource node $u \in V - \{r\}$ is termed reachable if there is a directed path from r to node u. Otherwise, node u is termed unreachable. In the following it is assumed that G, as seen from r, contains only reachable nodes. A reachable node u is called 2-node-disjoint reachable or simply 2-reachable if G contains at least 2-node-disjoint paths from r to node u, otherwise, it is termed 1-reachable. A cut node (cut link) is a node (link) such that its removal from G makes some of the nodes unreachable from r. A subgraph H(V,A) of G where $A \subset E$ is termed reachable if every node $u \in V - \{r\}$ is reachable from r by using only links in A.

The graph G is termed strong 2-reachable with respect to r if every node $u \in V - \{r\}$ is 2-reachable. If G is not strong 2-reachable, it is said that G is weak 2-reachable for a given set $D \subset V - \{r\}$ if every node $u \in D$ is 2-reachable from r.

The above definitions imply that a weak 2-reachable graph contains a cut node or a cut link. Referring to FIG. 1 there may be seen a weak 2-reachable graph for the set D={u, v, w}. Notice that in this graph the link (r, b) is a cut link since its removal makes node b unreachable from r.

Redundant Multicast Trees

Figure 2:
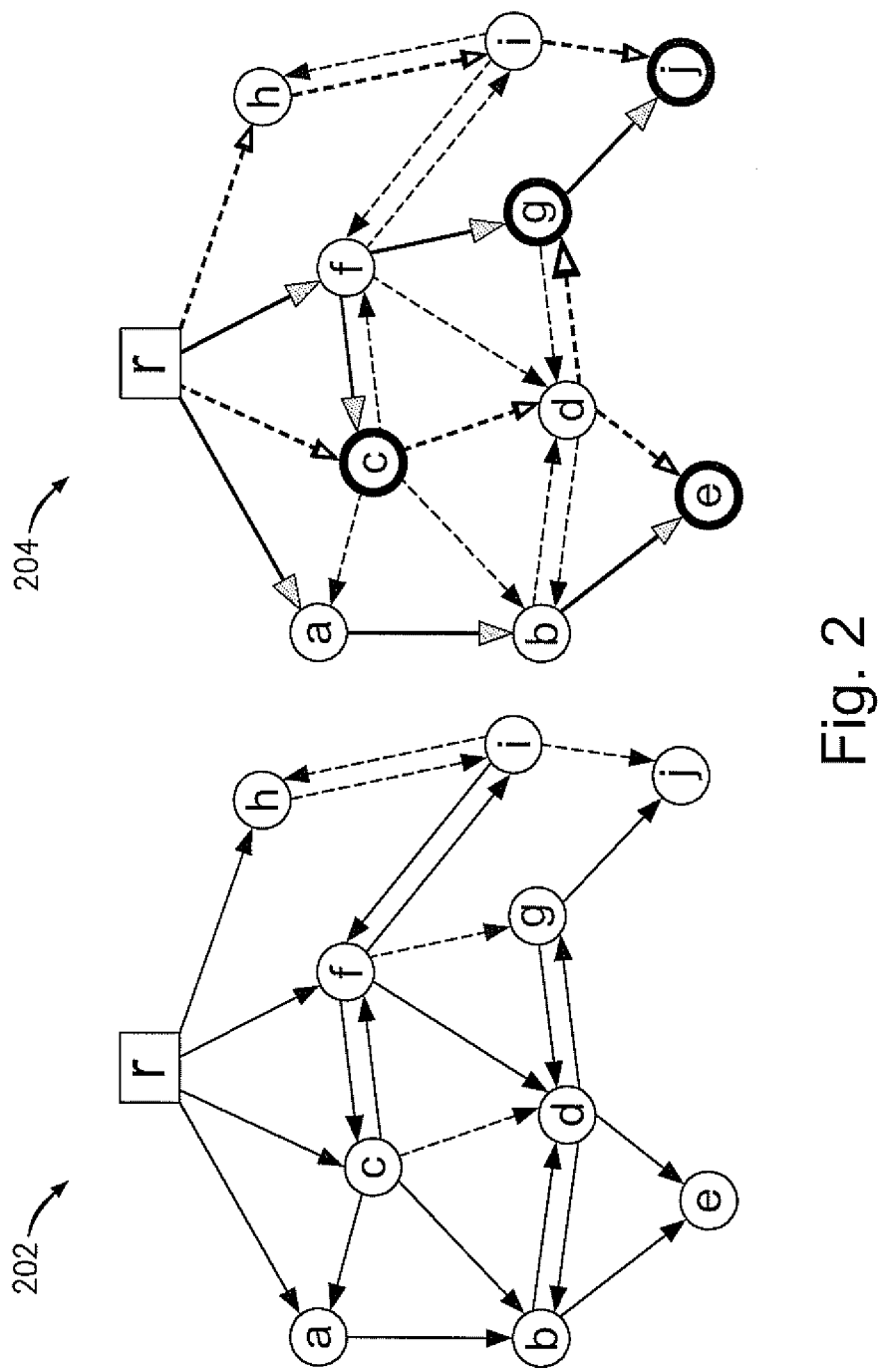
FIG. 2 illustrates a graph of a network as a directed graph and the same network with Redundant Multicast Trees in accordance with an embodiment of the invention.

Given a root node r and a set of destination nodes $D \subset V - \{r\}$, let two trees, $T_B$ and $T_R$, represent P2MP LSPs rooted at r and providing multicast connectivity from r to D Let $P_B(r,u)$ ($P_R(r,u)$) represent the path from r to $u \in D$ in $T(T_R)$. $T_B$ and $T_R$ are referred to as redundant multicast trees (RMT) or an RMT pair if $\forall_u \in D, P_B(r,u)$ and $P_R(r,u)$ are 2-node disjoint. The two trees of an RMT pair are referred to as the blue tree and the red tree. Referring to FIG. 2, there may be seen a directed graph 202. An RMT pair 204 for this directed graph having the root node r and set of destinations D={c, e, g, j} is depicted with the destination nodes.

For an RMT pair comprising of trees $T_B$ and $T_R$, let $E_B$ and $E_R$ be the set of edges in $T_B$ and $T_R$, respectively. $T_B$ and $T_R$ are referred to as strict RMTs or as a strict RMT pair if $(E_B \cap E_R) = \phi$. In other words, an RMT pair is strict if the two trees do not share any directed edges. An example of strict RMTs is given in FIG. 2 at 204. It can be noted that for a root and a set of destinations $D \subset V$, while RMTs may exist, they may not be strict even when every $u \in D$ is 2-reachable from r. As an example, consider the graph presented in FIG. 1 at 102. This graph contains a single source node r and three destination nodes, u, v and w. Notice that in this example there are two node disjoint paths from the source node to every destination node, and yet, there are no two strict RMTs that connect the source with the destination nodes. By way of explanation, assume for contradiction that such two trees that form a strict RMT pair exist. At least one of the trees contains just one of the outgoing links of the source nodes. However, in this example any tree that is connected to all three destination nodes must include at least two outgoing links of r. From this it follows that a strict RMT pair does not exist for the given topology. If an RMT pair is not strict, it is referred to as a relaxed RMT pair. FIG. 1 at 104 presents a relaxed RMT pair for the above example. In this example both trees use the links (r,b), (b,d) while still providing 2-node disjoint paths to every destination node. This example demonstrates that relaxed RMTs can be found even in cases where strict RMTs do not exist, A necessary condition for the existence of an RMT pair in a given graph G is that G has weak 2-reachability with respect to a root node r for a destination set D. However, the above example implies that this is not a sufficient condition for the existence of strict RMTs. It is shown below that strong 2-reachability is a necessary and sufficient condition for the existence of strict RMTs. Furthermore, Theorem 1 states that in the absence of strong 2-reachability, the problem of determining the existence of strict RMTs is NP-hard.

THEOREM 1: Consider a directed graph G(V,E) with a source node r and a set of destination node D ⊂ V. Assume that G is weak 2-reachable for the set D. The problem of finding strict RMTs that connect r with all the destination nodes in D is NP-hard.

Obviously, for efficient bandwidth consumption it would be preferred to construct RMTs with minimal total cost, referred to as optimal RMT-pair. However, as Theorem 2 states the problem of finding the optimal RMT-pair for a given set of destination is NP-hard. Consequently, the following disclosure presents an efficient method for constructing and maintaining low-cost RMT-pairs that may not be the optimal ones.

THEOREM 2: Consider a directed graph G(V,E) with a source node r and a set of destination node D ⊂ V. Assume that G is strong 2-reachable. The problem of finding the minimal cost RMT pair (either strict or relaxed RMTs) that connect r with all the destination nodes in D is NP-hard.

Overview of Protection Scheme

As previously discussed, the overall goal, given a multicast connection request M with root node r and set of destination nodes D, is to construct an RMT pair for M and to ensure that this RMT pair continues to be an RMT pair as the constituent trees get updated due to changes in the destination set and/or network topology. This goal can be expressed as the following set of distinct objectives.

OBJECTIVE 1. (INITIAL RMT CONSTRUCTION): Given a directed graph G(V,E) with a source node r and a set of destination nodes D, find an RMT pair rooted at with low total cost.

OBJECTIVE 2. (RMT UPDATE DUE TO TOPOLOGY CHANGES): Given a directed graph G(V,E), an RMT pair, and a set of topology changes, modify the red and blue trees of the RMT pair with minimal changes and in such a manner that the resulting red and blue trees continue to be a low cost RMT pair.

OBJECTIVE 3. (RMT UPDATE DUE TO ADD/DEL OF DESTINATION NODE): Given a directed graph G(V,E), an RMT pair, and a node d to be added or deleted as a destination node to the multicast connection corresponding to the RMT pair, modify the blue and red trees of the RMT pair to add or delete d with a reasonably small number of changes and in such a manner that the resulting red and blue trees continue to be a low cost RMT pair.

Initial RMT Construction

Figure 3:
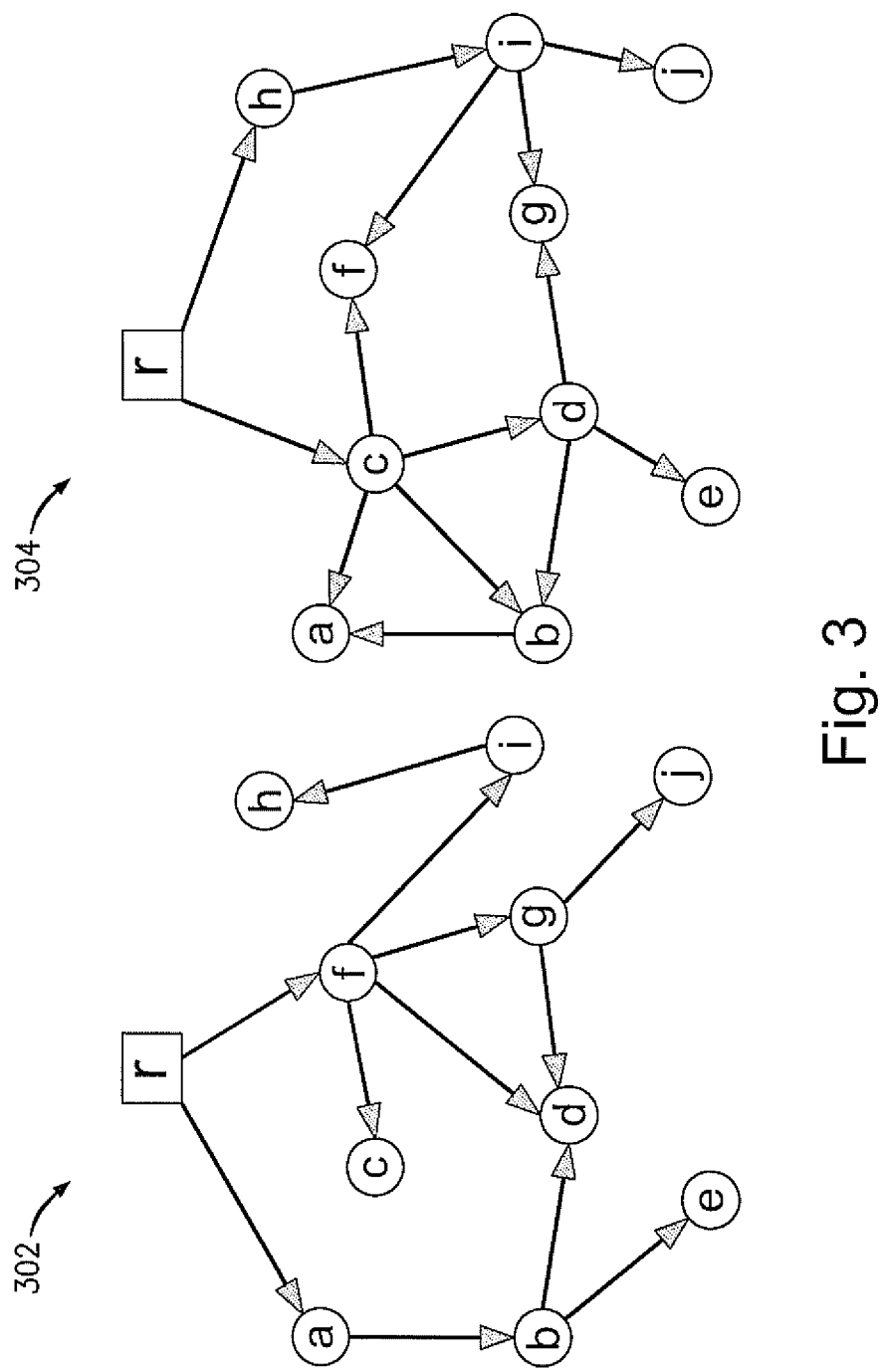
FIG. 3 illustrates an example of a partitioning of the network of FIG. 2 into red and blue graphs in accordance with an embodiment of the invention.

Theorem 2 claims that the problem of finding optimal RMTs in the case where the set of destination nodes does not include all the non-root nodes is NP-Hard. Following is a method that constructs low cost RMTs. In the method, low-cost RMTs for multicast connections with root node r are constructed as follows: the graph G(V,E) representing the network as seen by node r (for example, constructed from the OSPF link state database) is logically partitioned into two, referred to as the blue and red partitions, such that each partition consists of all the nodes in the network and contains a subset of the links. These partitions are directed acyclic subgraphs of G. The blue and red partitions, represented by the graphs $G_B(V,E_B)$ and $G_R(V,E_R)$, respectively, satisfy the following property. If there are no cut links or nodes in G, then $(E_B \cap E_R) = \phi$. Otherwise, $(E_B \cap E_R)$ may contain the cut links and the outgoing links of the cut nodes. Let $P_R(u,v)$ denote the path from a to v in the red partition, and $P_B(u,y)$ denote the path from u to v in the blue partition. Referring to FIG. 3, there may be seen an example of such red 302 and blue 304 partitions for the graph presented in FIG. 2 at 102. The red 302 and blue 304 partitions satisfy the following property.

PROPERTY 1. (a) For every 2-reachable node $u \in V-\{r\}$ it holds that any path $P_R(r,u)$ from r to a in $G_R$ is node disjoint from any path $P_B(r,u)$ from r to u in $G_B$. (b) For every 1-reachable node $u \in V-\{r\}$ it holds that any path $P_R(r,u)$ from r to u in $G_R$ may share only cut nodes and cut links with path $P_B(r,u)$ from r to u in $G_B$.

Figure 4:
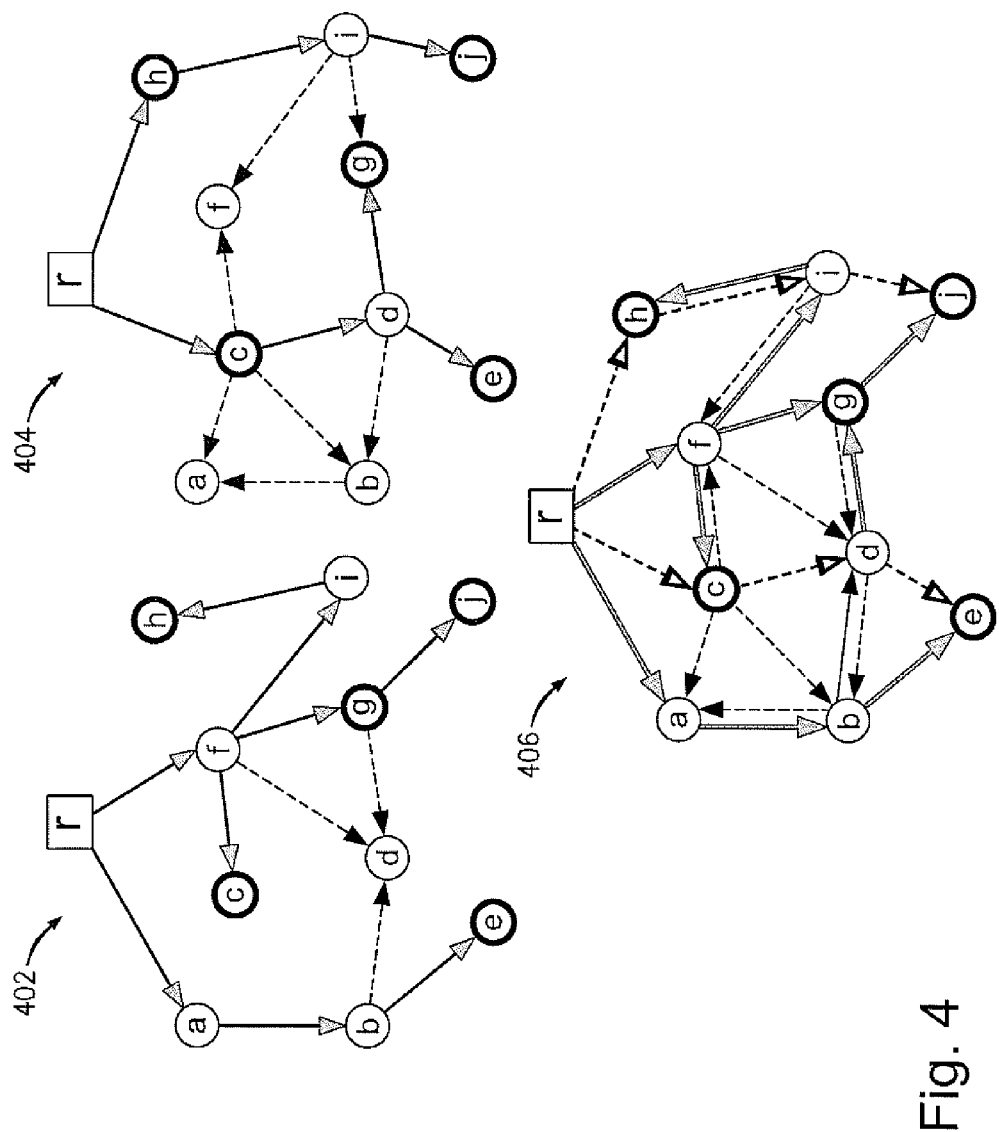
FIG. 4 illustrates an example of an RMT pair for a given multicast connection with defined source and definition nodes in accordance with an embodiment of the invention.

Consider now, a multicast connection request M with root node r and a set of destination nodes $D \subset V-\{r\}$. Given the above red and blue partitions, one can construct a P2MP LSP for M in the blue and red partitions. The trees for these P2MP LSPs can be either shortest path trees or Steiner trees, or based on any other mechanism. There are no constraints imposed on the tree construction mechanism within a partition. For the sake of simplicity, the shortest path tree algorithm is used in all illustrative examples in this disclosure. In any case, Property 1 implies that the two trees form an RMT pair if all the nodes in D are 2-reachable from r. In the case where some destinations are only 1-reachable, some cut links and nodes may be shared by the two trees. Notice that, for destination nodes that are only 1-reachable, no scheme can offer any protection against the failure of cut links and nodes. Referring to FIG. 4 there may be seen the two RMTs of a multicast connection sourced at node r with destination nodes D={c, e, g, j, h}. At 402 may be seen the Red RMT, and at 404 the Blue RMT. At 406 the conjoined graph demonstrates that the two RMTs indeed induce two node disjoint paths to every destination node wherein the dashed links of 406 represent the Blue partition and the solid links the Red partition. While such a partitioning could be done on a per connection basis, due to implementation practicality considerations, a single partitioning is preferred for all multicast connections rooted at r, independent of their set of destination nodes.

Given the above partitioning scheme, when a connection setup request arrives at node r, r computes the trees for the blue and red P2MP LSPs and performs setup signaling according to the supported signaling mechanisms (for example, IETF standard procedures). The destination nodes would need to be provisioned with information to facilitate recognition that these two P2MP LSPs form an RMT pair being used for protection. Such a feature is straightforward to implement. As suggested earlier, a mechanism needs to be in place for the root and a destination node to assist connectivity verification through the P2MP LSP connecting them.

RMT Update for Topology Changes

Any protection scheme for MPLS multicast must also be flexible enough to support dynamic changes in topology with little or no disruption to the existing connections. In the disclosed method, this translates into ensuring that topology changes induce little or no changes to the existing RMT pairs. Recall that, for a given root node r, there was created logical blue and red partitions of the network. Topology changes may affect a given RMT pair in one of the following ways: a) all the destination nodes continue to be reachable in both the blue and red trees, b) one or more destination nodes is not reachable from r in one of the two trees, and c) one or more destinations is unreachable in both the blue and red trees. For a) and b), unless further topology changes happen, there is no service disruption for the MPLS connection and therefore it may be acceptable to take no further immediate action. For c), however, immediate action may need to be taken depending on the service restoration requirements for the affected destination(s). In the event that there are RMTs for which one or more destinations become unreachable from r in both the blue and red partitions, but such destinations are still reachable from r in the overall graph G, the method uses a repartitioning method that is described in detail below. The repartitioning is done is such a manner that only a small number of links need to change their color from blue to red or from red to blue. After such a repartitioning is performed, the following cases are considered for each individual RMT pair rooted at r.

Case I: The RMT is not impacted by the topology change. All the nodes and links of the RMT are still active and none of the links have changed their color. In such case, nothing needs to be done for this RMT.

Case II: All the RMT nodes and links are active but some links changed their color. Such an anomaly, by itself, does not have any impact on the protection capability for such RMTs. However, if new leaves are added to such an RMT, while protection is not compromised as long as there are paths to this new leaf in both the current red and blue partitions, it may be possible that the bandwidth usage on some links can be inefficient. This would be the case when a previously blue (red) link is used in the red (blue) partition for the new leaf. It is suggested, therefore, that new leaves may only be added to such RMTs after this anomaly is fixed by rerouting the paths of the trees that have mixed colors according to the current partitioning. Unless there is an outstanding request to add a new destination with immediate effect, such rerouting does not need to be performed immediately after the repartitioning and can be paced in accordance with the computing resources available at the network nodes. To ensure that during the reroute process the connection is fault resilient using a make-before-break approach is suggested for each modified RMT path. If a new leaf needs to be added to such connection, the RMTs are rerouted before the leaf is added.

Case III: The topology change affects the RMT. This means that some destination nodes are not reachable by the RMT and therefore they are no longer protected. In such case those RMT paths are rerouted to the affected destination nodes in each of the two partitions. Similar to case II, a make-before-break approach is suggested.

RMT Update for Add/Del of Destination Nodes

As with topology changes, any protection scheme must be robust in the presence of dynamic updates to the set of destination nodes of a multicast connection. In the present method, recall that the initial partitioning method partitions the network independent of the set of destination nodes for any connections rooted at r. Therefore, Property 1 is satisfied for any set of destination nodes, even if it is updated dynamically to include or delete nodes. Adding or deleting destination nodes is simply applying standard procedures used in existing MPLS networks within each of the blue and red partitions. Also note that, even in the presence of topology changes, adding and deleting destinations is straightforward due to the property of the repartitioning method that ensures only a small number of links with color changes, and the suggested restriction that no new destinations be added to RMTs that have mixed color RMT paths.

Figure 5:
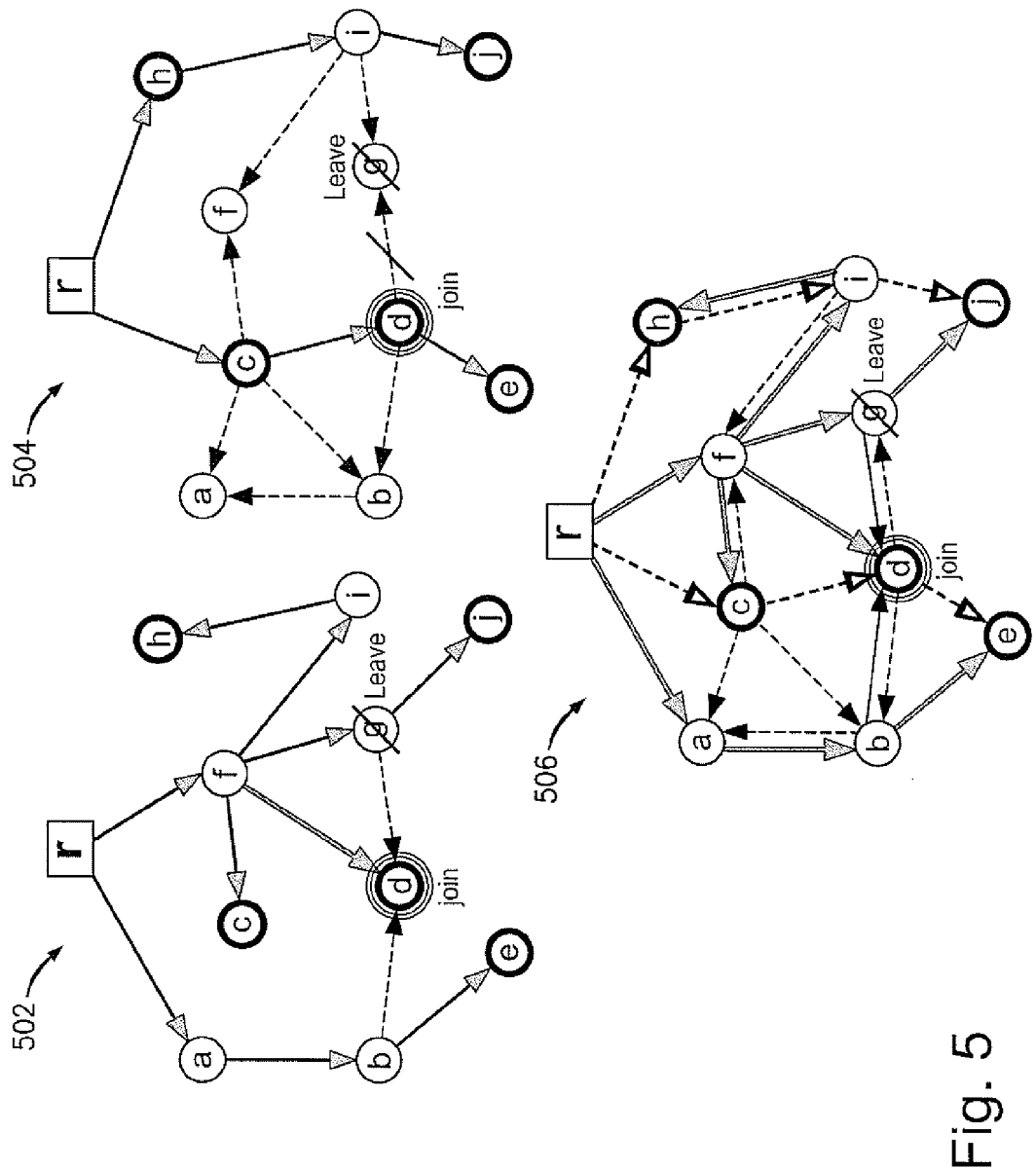
FIG. 5 illustrates an example of join and leave operations in accordance with an embodiment of the invention.

Referring to FIG. 5 there may be seen the effects of adding node d as a new destination and removing node g from the destination set. The Red RMT 502 and the Blue RMT 504 illustrate the two RMTs after the join and leave operations, while the conjoined graph 506 in which the Blue RMT has dashed links and the Red RMT has solid links, shows that the two resulting trees are two valid RMTs. In this example node d is already included in the blue tree, thus the scheme adds only the link (c,d) to the blue tree. For the leave operation node g is conceptually a branching node of the red tree since it also feeds node j. Therefore no link is removed from the red tree, and only link (d,g) is removed from the blue tree.

Initial Partitioning Method

Consider a directed graph G(V,E) with a root node r. The objective of the initial partitioning method is to build two subgraphs $G_B(V,E_B)$ and $G_R(V,E_R)$ that correspond to the blue and red partitions satisfying Property 1. The proposed method contains two phases:

Phase I: Node Ordering—This phase creates an ordered list L of nodes such that every non-root node has at least one preceding incoming neighbor and at least one succeeding incoming neighbor in L.

Phase II: Construction of Two Subgraphs—This phase utilizes the node ordering from phase I to construct the red and blue subgraphs satisfying Property 1 and ensuring that every non-root node is reachable in both the subgraphs.

These two phases are elaborated in the following sections. To begin with, in the method description, it is assumed that the input graph G is strong 2-reachable. This assumption is relaxed in a following section. In a subsequent section, there is a discussion of the correctness and complexity aspects of the method.

The Node Ordering Method

DEFINITION 1. (A COMPLETE NODE ARRANGEMENT): Given a directed graph G(V,E) with a root node r. Let L be an ordered list of the nodes where the first and last elements in the list represent the root node r and every other element in the list uniquely represents one of the non-root nodes. The list L is called a complete node arrangement if every non-root node has incoming neighbors both before and after it in the list L.

It will later be shown that a complete node arrangement is sufficient for constructing the two subgraphs that satisfy Property 1. The list construction process contains two steps. In the first step a skeleton list $\hat{L}=\{U_1=\{r\}, U_2, U_3, \ldots, U_m=\{r\}\}$ is calculated that provides only a partial order of the nodes. Then, at the second step, the order of the nodes is refined in each set $U_j$.

Consider a collection $\hat{L}=\{U_1=\{r\}, U_2, U_3, \ldots, U_m=\{r\}\}$ with two or more node sets that contains all the graph nodes. The first and the last sets $U_1$ and $U_m$ contain only the root node r (notice that only the root node is represented twice in the list L) and every other set $U_j$ contains one or more non-root nodes. Each set $U_j$ represents a directed subtree $T_v$ in G rooted at some node v. By $root(U_j)=v$ is denoted the root node v of the set. $U_j$ is also referred to as the set root node. Since every non-root node is included in a single set $U_j$, the root node of a set is used as a unique identification of its set. By $root(u)=v$ is denoted the root node of the set $U_j$ containing u.

A set $\hat{L}$ of subtrees is termed a skeleton list if it satisfies a partial node arrangement such that for every set $U_j$, $1<j<m$, its root root $(U_j)$ has at least one incoming neighbor in a set before $U_j$ in $\hat{L}$ and at least one incoming neighbor in a set after $U_j$ in L. Recall that if every set $U_j \in \hat{L}$ contains a single node then $\hat{L}$ defines a complete node arrangement. Following is presented an iterative process for calculating a complete node arrangement. It starts with an initialized skeleton list $\hat{L}$ and at each iteration it increases the number of sets in $\hat{L}$ while preserving partial node arrangement.

The Skeleton List Initialization Step: The method starts by calculating a spanning tree T rooted at r. The calculated tree can be any spanning tree, however, for calculating low cost RMTs the method calculates a minimal cost spanning tree. Then, it constructs a list with $|N_r|+2$ sets, where $N_r$ denotes the outgoing neighbors of in the tree T. The first and last sets contain only the root node r. For every node $v \in N_r$ the method creates a set $U_j$, $2 \leq j \leq |N_r|+1$ that represents the subtree $T_v$ of T rooted at the node v. Notice that the list thus created is a skeleton list that satisfies the partial node arrangement since the first and the last sets contain r and r is an incoming neighbor of the root of every set $U_j$.

The skeleton List Refinement Step: The method then iteratively finds a link (u,w)∈E between two nodes in different sets, such that w is not a set root node, i.e., root(w)≠root(u) and root(w)≠w. While any link that satisfies this condition can be selected, for producing low cost RMTs, the preferred method is to select the one with minimal cost. Let v=root(w) be the root of the set $U_v$ containing node w. The method removes the subtree $T_w$ from the tree $T_v$ and creates a new set $U_w$ that contains the nodes in w. In addition, for every node x2Tw the method sets root(x)=w. Let $U_u$ be the set identified by root(u). If $U_u$ appears before v in the skeleton list, then $U_w$ is inserted just before $U_v$ in the skeleton list $\hat{L}$. Otherwise, $U_w$ is inserted immediately after $U_v$ in $\hat{L}$. This process ends when every set contains a single node or the method cannot find such a link (u,w). It is later shown that if the graph G contains cut links and nodes, the refinement process may end before a complete ordering can be determined and describe our solution to dealing with cut nodes and links.

Figure 6:
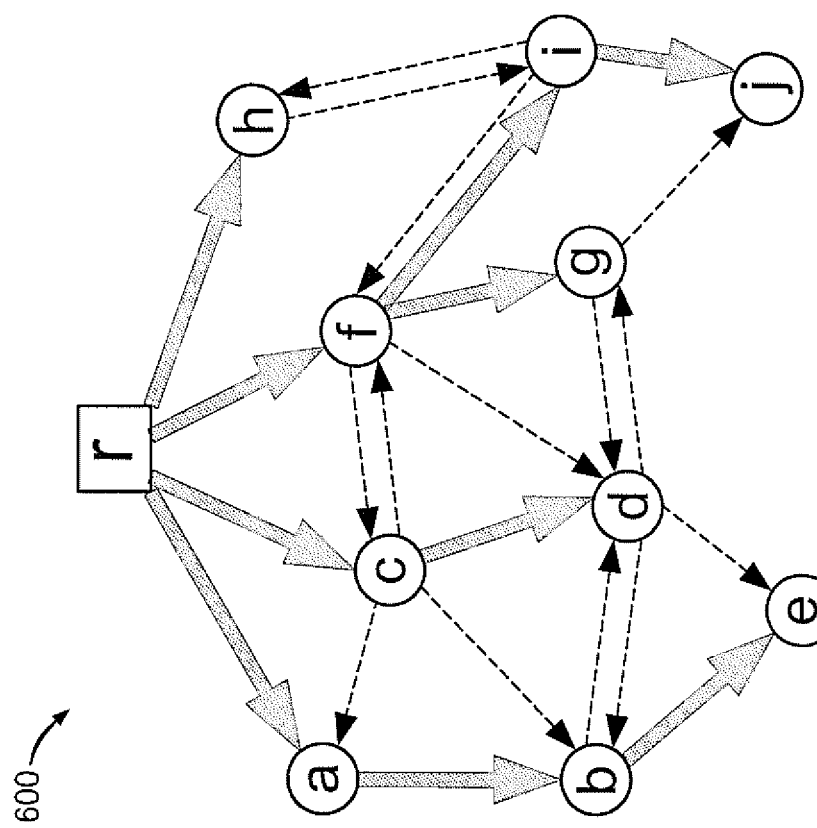
FIG. 6 illustrates an example of a calculated spanning tree in accordance with an embodiment of the invention.
Figure 7:
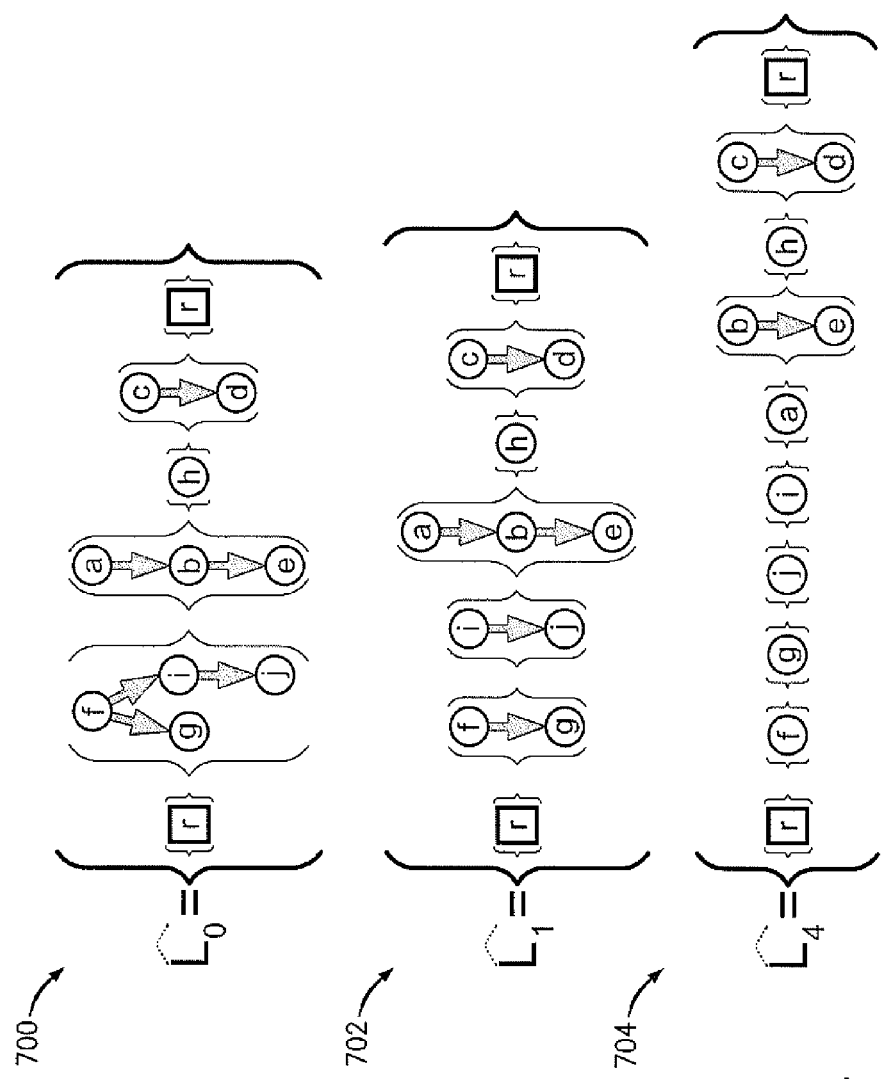
FIG. 7 illustrates a series of skeleton lists for the spanning tree of FIG. 6 in accordance with an embodiment of the invention.
Figure 8:
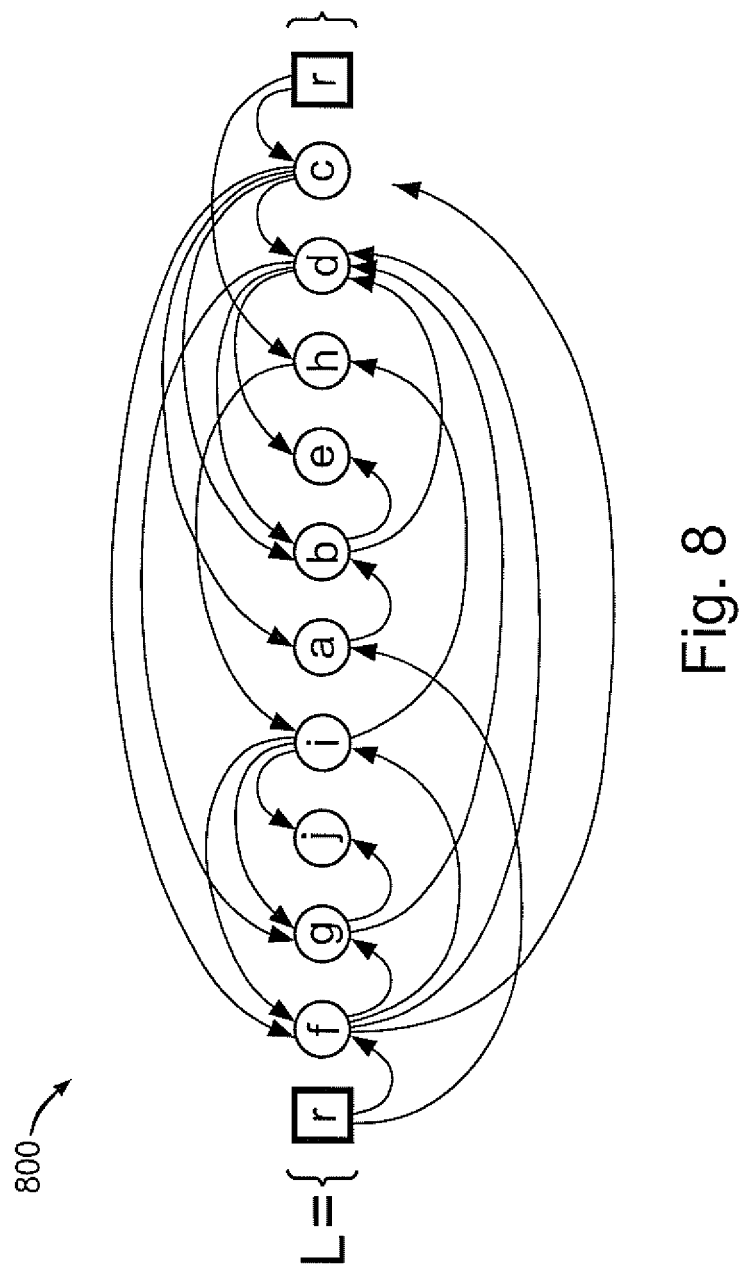
FIG. 8 illustrates the final skeleton list for the spanning tree of FIG. 6 with red and blue links in accordance with an embodiment of the invention.

FIG. 6 illustrates the intermediate skeleton-lists calculated by the node ordering method for the input graph shown in FIG. 2 at 202. FIG. 6 illustrates the spanning tree calculated by the method and the corresponding initial skeleton list is given in FIG. 7 at 700. At 702 and 704 are illustrated the skeleton lists obtained after one and four iterations respectively. FIG. 8 at 800 illustrates the complete node arrangement defined by the skeleton list with the Blue links at the top and the Red links at the bottom.

The Subgraphs Construction Phase

After constructing a list L that represents a complete node arrangement the method computes red and blue graphs, denoted by $G_R(V,E_R)$ and $G_B(V,E_B)$ respectively, that satisfy Property 1. Each one of subgraphs contains all nodes while the subgraphs contain disjoint set of links. The link set $E_R$ of the red graph comprises every link (u,v) such that u≠r and the set root(u) appears before the set root(v) in L. Similarly, the link set $E_B$ of the blue tree contains every link (u,v) such that u≠r and the set root(u) appears after the set root(v) in L. Links in $E_R$ will be referred to as red links and links in $E_B$ as blue links.

Special treatment is given to the outgoing links of r. Since r is represented by both the first and the last sets in L, every outgoing link (r,u) of r may be included in either one the subgraphs and therefore will have both red and blue outgoing links. However, note that this may not be the case for one or more outgoing neighbors of r. Therefore, it is necessary to verify that the two subgraphs induce two node disjoint paths to every outgoing neighbor u∈$N_r$ of r. Such a requirement is preserved only if an outgoing neighbor u∈$N_r$ of r has another non-root incoming neighbor with a different colored link. The following is performed to ensure that this requirement is preserved. If all the incoming non-root neighbors of node u appear after node u in L, then the link (r,u) is colored red and added to the red graph. If all the incoming non-source neighbors of node u appear before node u in L, then the link (r,u) is colored blue and added to the set $E_B$ of the blue graph. Else if node u does not have any other incoming neighbor beside r then link (r,u) is a cut link and it is added to both $E_B$ and $E_R$. Otherwise, the link (r,u) may be added to one of the subgraphs based on some other criteria, such as balancing the number of red and blue outgoing links from the root node r.

Consider the complete node arrangement calculated in FIG. 6 at 600. FIG. 8 at 800 illustrates the link coloring that results from this arrangement with the blue links on top and the red links at the bottom. In this case, the links (r,a) and (r,f) must be red, while the links (r,c) and (r,h) must be blue.

Handling Cut Nodes and Links

The method is extended in the discussion that follows to deal with any directed graph G(V,E) including instances that are not 2-reachable and may contain cut nodes and links. Recall that in the previous subsection there has already been considered the case that an outgoing link of r is also a cut link and it was inserted into both the red and blue subgraphs. Now, consider a cut link (u,v) where u≠r. From this it follows that the node u itself must be a cut node. Thus, the method for cut nodes addresses cut links as well.

The method is based on detecting cut nodes and using a node duplication technique to produce a revised input graph that is 2-reachable. After this modification, the method may provide only relaxed RMTs even for some scenarios where the destination nodes are 2-reachable from r. This is aligned with Theorem 1 which states that in such settings, finding strict RMTs is NP-hard. Since the cut nodes are not known in advance, Property 2 can be used to detect them at the end of the node ordering process, presented earlier.

PROPERTY 2. Let $\hat{L}$ be the skeleton list calculated by the node ordering method. If $\hat{L}$ contains a set $U_j$ with two or more nodes that cannot be refined, then the root node root($U_j$)=v of the set $U_j$ is a cut node of G and the other nodes in are reachable only through node v.

For each detected cut node v in a set $U_j$, the method performs node duplication for obtaining a revised graph in which v is not a cut node. First, it defines another node $\hat{v}$ with the same incoming neighbors as node v and the outgoing neighbors of $\hat{v}$ are the outgoing neighbors of v in the set $U_j$. Then, the method removes any incoming link (w,v) of node v and node $\hat{v}$ such that its tail w is in the set $U_j$. This operation eliminates loops in the final red and blue subgraphs. Finally, it creates a new set $U_k=\{\hat{v}\}$ with just the node $\hat{v}$ and it inserts $U_k$ in $\hat{L}$ just after the set $U_j$. Notice that, after this modification, node v is no longer a cut node since every node that was reachable only via node v is now also reachable through node $\hat{v}$. After performing node duplication for every detected cut node v, the method resumes the iterative skeleton list refinement process as before until every set contains a single node or additional cut nodes are detected. In the latter case, the node duplication process is repeated until every set in $\hat{L}$ contains a single node and a complete node arrangement is obtained.

Figure 9:
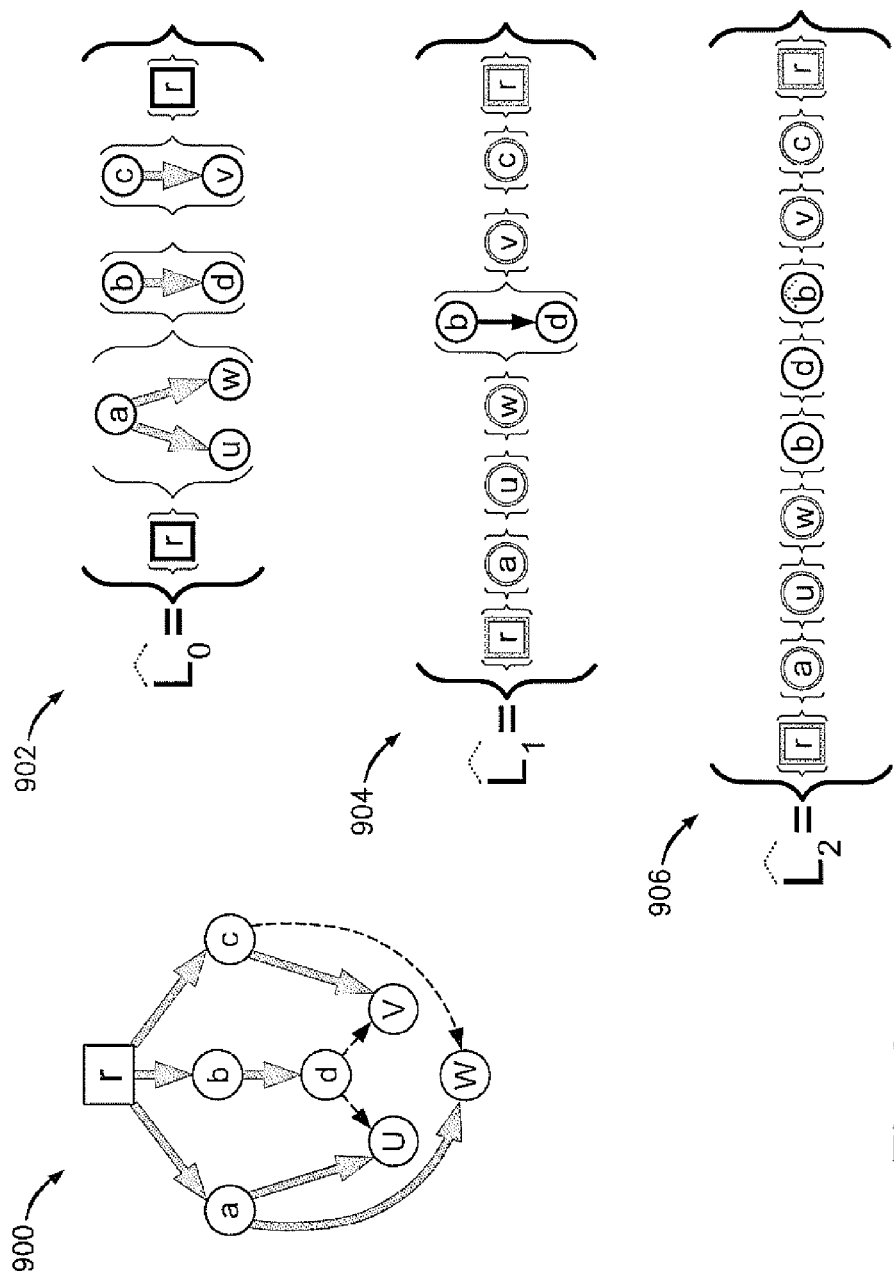
FIG. 9 illustrates an example of a calculated spanning tree and a series of associated skeleton lists in accordance with an embodiment of the invention.
Figure 10:
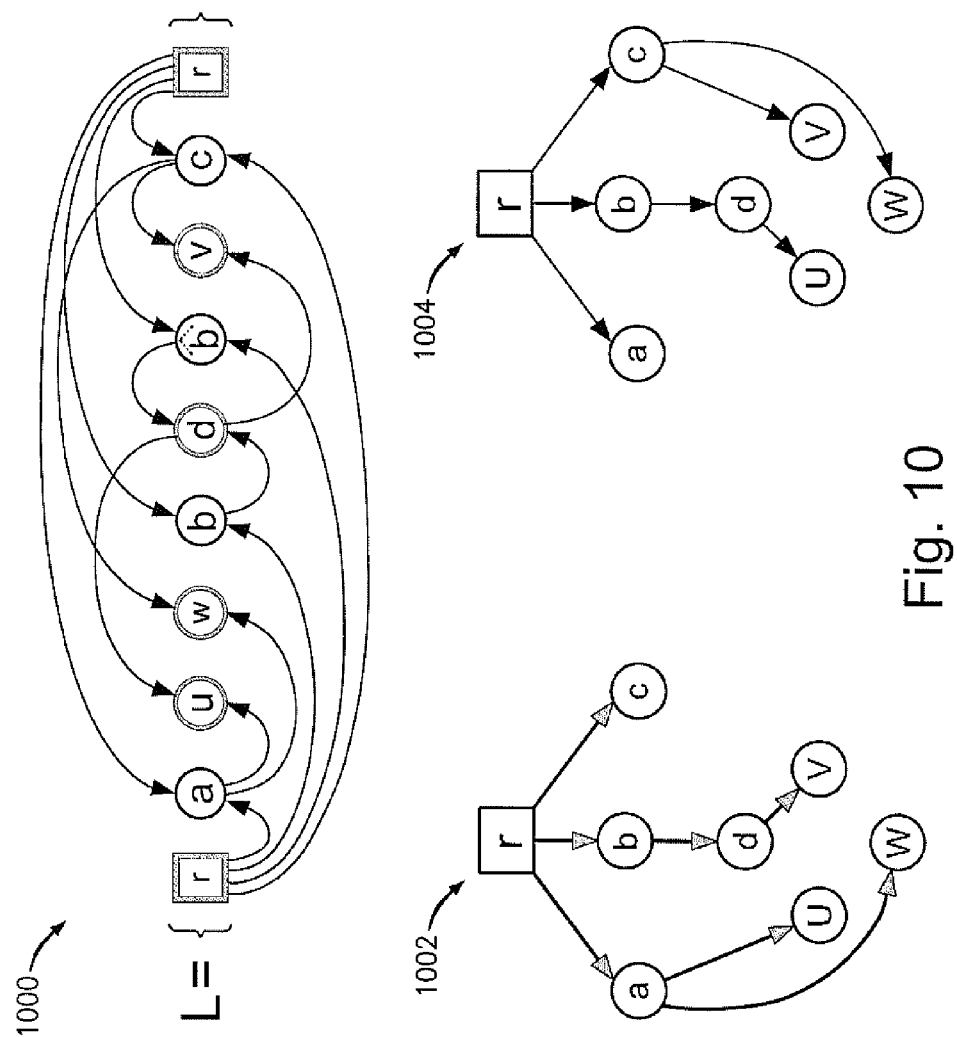
FIG. 10 illustrates the final node arrangement with red and blue links, and the calculated red and blue subgraphs for the spanning tree depicted in FIG. 9 in accordance with an embodiment of the invention.

Referring to FIGS. 9 and 10, there may be seen an illustration of the revised method for handling cut nodes and cut links. Consider the input graph given in FIG. 1 at 102. In this graph node b is a cut node and all the out going links of root node r are cut links. FIG. 9 presents the initial spanning tree 900 calculated for this graph and the initial skeleton list is given at 902. At 904 is given the obtained skeleton list after the refinement process. Since nodes b and d are still included in the same set, it results that h (the root of the set {b,d}) is a cut node. At 906 is given the final node arrangement after duplicating node b and invoking the skeleton list refinement process again. Note that the resulting list presents a complete node arrangement in which cut nodes are represented twice in the list.

After constructing a list L that represents a complete node arrangement, the method colors each one of the network links as described in the previous section wherein the subgraphs construction phase was disclosed. In the case of a cut node v, special treatment is given to each one of its out going link (v,u) in G. Recall that node v is represented in L by two nodes denoted by v and $\hat{v}$, thus an outgoing neighbor u of node v may be located between node v and node $\hat{v}$ in the set L. In such a situation, the link (v,u) and (v̂,u) in the revised graph are colored with different colors and therefore the actual link (v,u) is added to both the red and the blue subgraphs.

Consider the node arrangement and link coloring illustrated in FIG. 10 at 1000. In this example the links (r,a), (r,b), (r,b̂), and (r,c) are detected as cut links and are colored with both red and blue. In addition, the actual link (b,d) is represented in the revised graph by both the links (b,d) and (b̂,d). These two links are colored with both red and blue. Thus, the link (b,d) is associated with two colors. Finally, in FIG. 10 the calculated red 1002 and blue 1004 graphs are presented.

Re-Partitioning Method

In this section the method is extended to address topology changes. In the event of a topology change (any number of new network elements or component failures) minimal modifications are performed to the red and blue subgraphs for preserving Property 1. The modifications are based on the observation that the actual locations of the nodes in a complete node arrangement L are not critical for calculating the red and blue subgraph. In practice, the topologies of the subgraphs are determined by the placement of each node relative to the locations of its incoming and outgoing neighbors in L.

The method works as follows: Initially, it detects a limited set of nodes, denoted by Z, that their placement in the revised complete node arrangement may be affected. Then, by utilizing a limited variant of the node ordering process it computes a complete node arrangement as similar as possible to the original one and modifies the red and blue graphs accordingly.

Detecting Affected Nodes

Following is described an iterative process that determines a set Z of nodes that may be affected by the topology changes. Conceptually, the set Z contains every node in $u \in V$ that is not reachable in one or both of the subgraphs, or every path from the root node r to u in one of the subgraphs which traverses through other nodes from Z.

The method initializes the set Z with the following three node sets:

a) All the new nodes that have been added to the networks.
b) Every node that one of its incoming link has failed and as a result it does not have both red and blue incoming links.
c) Every 1-reachable node with new incoming neighbors.

Recall that 1-reachable nodes are detected during the skeleton list refinement process.

After initializing the set Z, the method iteratively identifies the other nodes that may be affected by the topology changes. For every node $u \in Z$ it removes its outgoing links from G and for every link (u,v) such that its head $v \notin Z$, it checks whether v still has both red and blue incoming links. Otherwise it adds to the set Z. The process terminates when all the outgoing neighbors of all the nodes in Z have been checked.

Recalculating the Arrangement of Affected Nodes

Next the method recalculates the list L. Essentially, it calculates a new skeleton list L̂ from the list such that the location of every node $u \in V-Z$ in the set L is preserved relative to its incoming neighbors. For determining the location of the nodes in Z, the method invokes the skeleton list refinement process presented in the node ordering method section that produces a revised complete node arrangement.

Like the initialization step in the node ordering method section, the method starts with calculating a directed spanning tree $T_r$ rooted at node r, such that no node in the set V–Z is a descendent of a node in Z. From the definition of Z such trees exist and can be calculated, for instance, by assigning a cost zero to all the incoming links of the nodes in V–Z and calculating a shortest path tree. Next, the method uses the existing complete node arrangement L to compute a new skeleton list L̂. First, it removes from L the nodes in Z. Thus, the resulting list L̂ contains only nodes in V–Z that preserve their relative order in L. Then, for every node $u \in V-Z$ that has children in the tree $T_r$ from the set Z, the method constructs the subtree $T_u$ rooted at node u and contains besides u only nodes in Z. This subtree is associated with the set root(u) that is already included in L̂. At the end of this step, L̂ contains all the networks nodes where every node in Z is associated with a set $U_j \in \hat{L}$ rooted by some node $u \in V-Z$.

Next the method invokes the skeleton list refinement process. Since, this step needs to find only the arrangement of the nodes in Z in the skeleton list, only the incoming links of the nodes in need to be considered for the order refinement. Finally, the method reconstructs the red and blue graphs as described in the subgraphs construction phase.

As a concluding example, following is an illustration of the reconstruction of the red and blue subgraphs when the residual network is not strong 2-reachable. Consider the input graph shown in FIG. 2 at 202 with red and blue graphs as illustrated in FIG. 3 and a complete node arrangement as depicted in FIG. 8. Now, assume a failure of node a. In this case, the resulting graph is not 2-reachable since node g is a cut node and the link (r,h) is a cut link. Here, the set of affected nodes Z={j,h}. Note that although nodes f and g are outgoing neighbors of node i they are not included in Z since they still have both red and blue ingress links.

Figure 11:
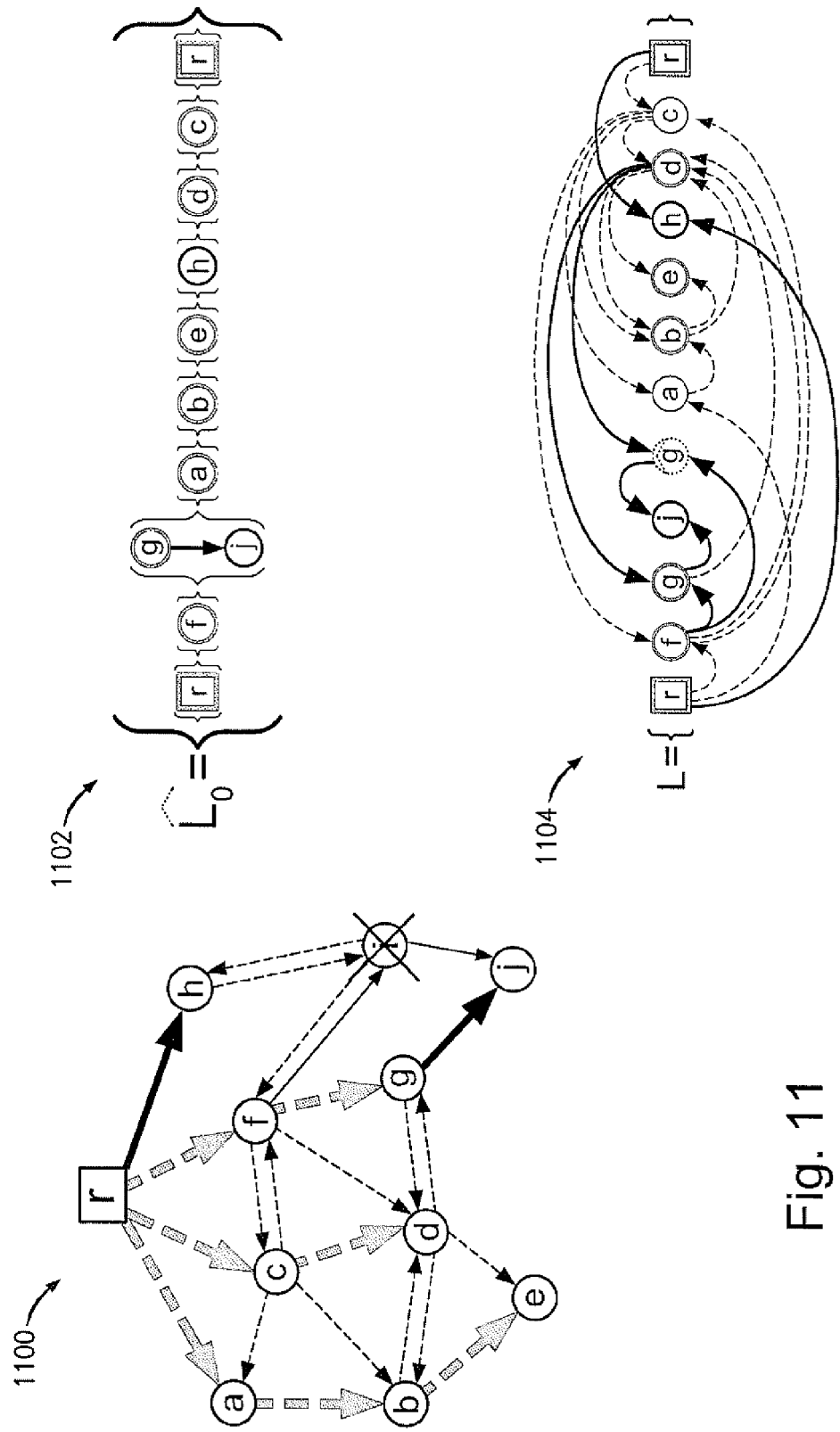
FIG. 11 illustrates an example of a spanning network having an affected node, and the skeleton list and final node arrangement associated with the spanning tree in accordance with an embodiment of the invention.
Figure 12:
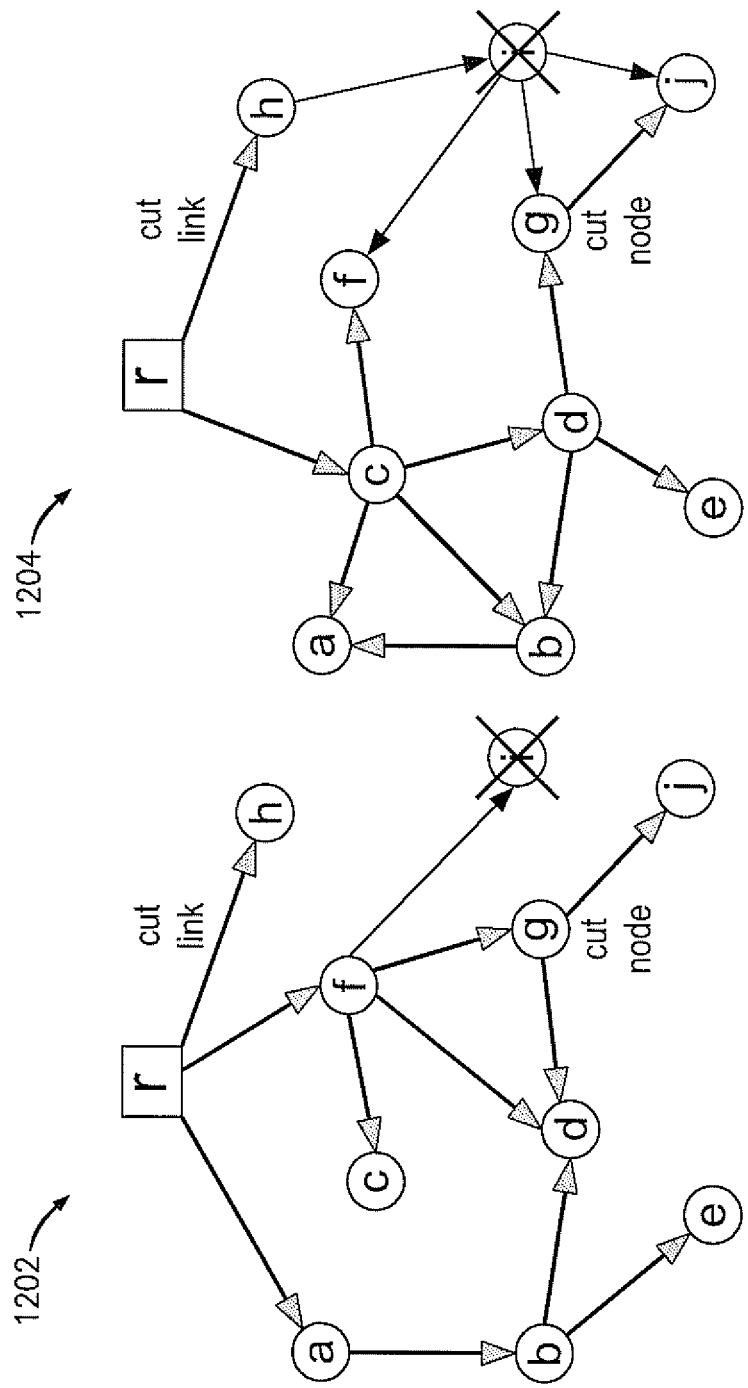
FIG. 12 illustrates an example of the final red and blue graphs of network of FIG. 11 after reconstruction in accordance with an embodiment of the invention.

FIG. 11 at 1100 shows the calculated spanning tree while FIG. 11 at 1102 and 1104 depict the initial and final skeleton list. Since node g is a cut node, it is duplicated and appears twice in the list. At FIG. 12 the modified red 1202 and blue 1204 graphs are shown. Notice that the links (g,j) and (r,h) are included in both graphs since nodes) and h are 1-reachable but not 2-reachable.

Simulation Setup & Results

The performance of the RMT based protection scheme was evaluated against different variants of the FRR scheme on data from publicly available network topologies representing major real world networks. All the considered networks were 2-connected where each network node is 2-reachable from every other node. In each simulation run, information was gathered about the bandwidth used for a primary as well as the detour/standby P2MP LSP with a randomly specified root and set of destination nodes.

The simulation results showed that the total bandwidth consumption and the total weight of the RMT solution are significantly lower than those of all the FRR variants.

Results for the weight ratio metric were observed to be similar to the one presented for the bandwidth ratio metric. This implies that that the RMT-based method not only consumes significantly less bandwidth than FRR, but also efficiently utilizes low weight links for keeping the total weight of the RMTs as low as possible. Note that the RMT scheme, which offers protection against both link and node failures, outperforms even the FRR Link Only (FRR-LO) scheme, which only provides protection against link failures.

Moreover, the simulations showed that the RMT scheme does not produce any packet duplication. Also, it was observed that RMT outperforms the other schemes even in the case of a single destination node. Overall, the higher the number of destination nodes, the better the RMT method performs compared to FRR.

By way of conclusion, there has been presented an RMT based protection scheme for multicast connections in MPLS networks. The scheme employs an efficient method for logically partitioning the network topology and uses the two resulting partitions in such a manner that independently routed P2MP LSPs within each partition, for the same root node and a set of destinations, for an RMT pair. It was shown that such partitioning may only need to be performed infrequently when substantial changes that impact reachability occur. This, coupled with the fact that the complexity of the partitioning scheme is comparable to that of standard shortest path tree computation schemes indicates that the scheme can be easily implemented on a network node. There was also presented a mechanism for repartitioning that minimizes the number of links that need to change color. Such a repartitioning scheme can significantly reduce the impact of topology changes on existing RMTs.

Via simulation it was demonstrated that the scheme substantially outperforms various MPLS FRR schemes in terms of bandwidth usage and also avoids packet duplication issues. Even in the case where FRR is used for only link protection, the scheme offers better performance and also provides protection against both link and node failures.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium or loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." Numerous modifications, variations and adaptations may be made to the embodiment of the invention described above without departing from the scope of the invention, which is defined in the claims.

What is claimed is:

1. A method for providing protection for a Multi-Protocol Label Switching (MPLS) multicast connection request for a root node and a set of destination nodes in a packet switched network having network nodes and communication links connecting said network nodes, said method comprising:
   constructing, with a processor, a pair of Redundant Multicast Trees, wherein the first Redundant Multicast Tree of said pair of Redundant Multicast Trees is rooted at said root node and connects to all destination nodes in said set of destination nodes and the second Redundant Multicast Tree of said pair of Redundant Multicast Trees is rooted at said root node and connects to all destination nodes in said set of destination nodes;
   broadcasting multicast traffic from said root node to said set of destination nodes over the first Redundant Multicast Tree during normal operation; and
   broadcasting multicast traffic from said root node to said set of destination nodes over both the first Redundant Multicast Tree and the second Redundant Multicast Tree during fault operation.

2. The method as claimed in claim 1, further comprising:
   broadcasting multicast traffic from said root node to said set of destination nodes over the second Redundant Multicast Tree during normal operation.

3. The method as claimed in claim 1, wherein said fault operation comprises a failure of a communication link of said communication links.

4. The method as claimed in claim 1, wherein said fault operation comprises a failure of a network node of said network nodes.

5. A method for constructing a pair of Redundant Multicast Trees for a Multi-Protocol Label Switching (MPLS) multicast connection request for a root node and a set of destination nodes in a packet switched network having network nodes and communication links connecting said network nodes, wherein said packet switched network can be represented by a graph as constructed from said root node, said graph having vertices comprising said network nodes and directed edges comprising said communication links, said method comprising:
   partitioning, with a processor, said packet switched network into a first partition and a second partition, wherein each partition consists of all of the network nodes of said packet switched network and contains a subset of said communication links so as to form an acyclic graph of said packet switched network, and said first partition and said second partition have only links in common of said graph of said packet switched network from a group of links consisting of cut links and links to cut nodes;
   constructing a first spanning tree connecting said root node and said set of destination nodes in said first partition;
   constructing a second spanning tree connecting said root node and said set of destination nodes in said second partition;
   provisioning said set of destination nodes with said first spanning tree and said second spanning tree as said pair of Redundant Multicast Trees, wherein there are two node disjoint paths from the root node to every destination node.

6. The method as claimed in claim 5, further comprising:
   updating said first and second partitions in the event of a change to a topology of said packet switched network.

7. The method as claimed in claim 6, wherein change to said topology of said packet switched network comprises a deletion of a network node.

8. The method as claimed in claim 6, wherein change to said topology of said packet switched network comprises an addition of a network node.

9. The method as claimed in claim 6, wherein change to said topology of said packet switched network comprises a failure of a communication link of said packet switched network which results in a network node lacking an incoming link in one of said first and second partitions.

10. The method as claimed in claim 5, wherein said partitioning step comprises:
creating an ordered list of network nodes such that every non-root node has at least one preceding incoming neighbor node and at least one succeeding incoming neighbor node in said ordered list.

11. The method as claimed in claim 10, said partitioning step further comprising:
formulating a pair of first and second subgraphs, wherein each of said subgraphs contains all network nodes, said first subgraph comprises a first set of communication links, said second subgraph comprises a second set of communication links, said first set of communication links is disjoint to said second set of communication links, said first subgraph corresponds to said first partition, and said second subgraph corresponds to said second partition.

12. The method as claimed in claim 11, said formulating step further comprising:
providing a subset of communication links common to said first and second set of communication links wherein said subset of common links consists of cut links and links to cut nodes of said graph.

13. The method as claimed in claim 12, further comprising:
updating said first and second partitions in the event of a change to a topology of said packet switched network.

14. The method as claimed in claim 5, wherein said first spanning tree comprises a shortest path tree.

15. The method as claimed in claim 5, wherein said first spanning tree comprises a Steiner tree.

16. An article of manufacture including a non-transitory medium having processor-executable code encoded therein, which when executed by one or more processors, enables actions for constructing a pair of Redundant Multicast Trees for a Multi-Protocol Label Switching (MPLS) multicast connection request for a root node and a set of destination nodes in a packet switched network having network nodes and communication links connecting said network nodes, wherein said packet switched network can be represented by a graph as constructed from said root node, said graph having vertices comprising said network node and directed edges comprising said communication links, said method comprising:
partitioning said packet switched network into a first partition and a second partition, wherein each partition consists of all of the network nodes of said packet switched network and contains a subset of said communication links so as to form an acyclic graph of said packet switched network, and said first partition and said second partition have only links in common of said graph of said packet switched network from a group of links consisting of cut links and links to cut nodes;
constructing a first spanning tree connecting said root node and said set of destination nodes in said first partition;
constructing a second spanning tree connecting said root node and said set of destination nodes in said second partition;
provisioning said set of destination nodes with said first spanning tree and said second spanning tree as said pair of Redundant Multicast Trees, wherein there are two node disjoint paths from the root node to every destination node.

17. The article of manufacture of claim 16, wherein said actions further comprise:
updating said first and second partitions in the event of a change to a topology of said packet switched network.

18. The article of manufacture of claim 16, wherein said actions further comprise:
in said partitioning step, creating an ordered list of network nodes such that every non-root node has at least one preceding incoming neighbor node and at least one succeeding incoming neighbor node in said ordered list.

19. The article of manufacture of claim 18, wherein said actions further comprise:
in said partitioning step, formulating a pair of first and second subgraphs, wherein each of said subgraphs contains all network nodes, said first subgraph comprises a first set of communication links, said second subgraph comprises a second set of communication links, said first set of communication links is disjoint to said second set of communication links, said first subgraph corresponds to said first partition; and said second subgraph corresponds to said second partition.

20. The article of manufacture of claim 19, wherein said actions further comprise:
providing a subset of communication links common to said first and second set of communication links wherein said subset of common links consists of cut links and links to cut nodes of said graph.

* * * * *